S. KEPNER.
Manure Fork.
No. 64,772.
Patented May 14, 1867.
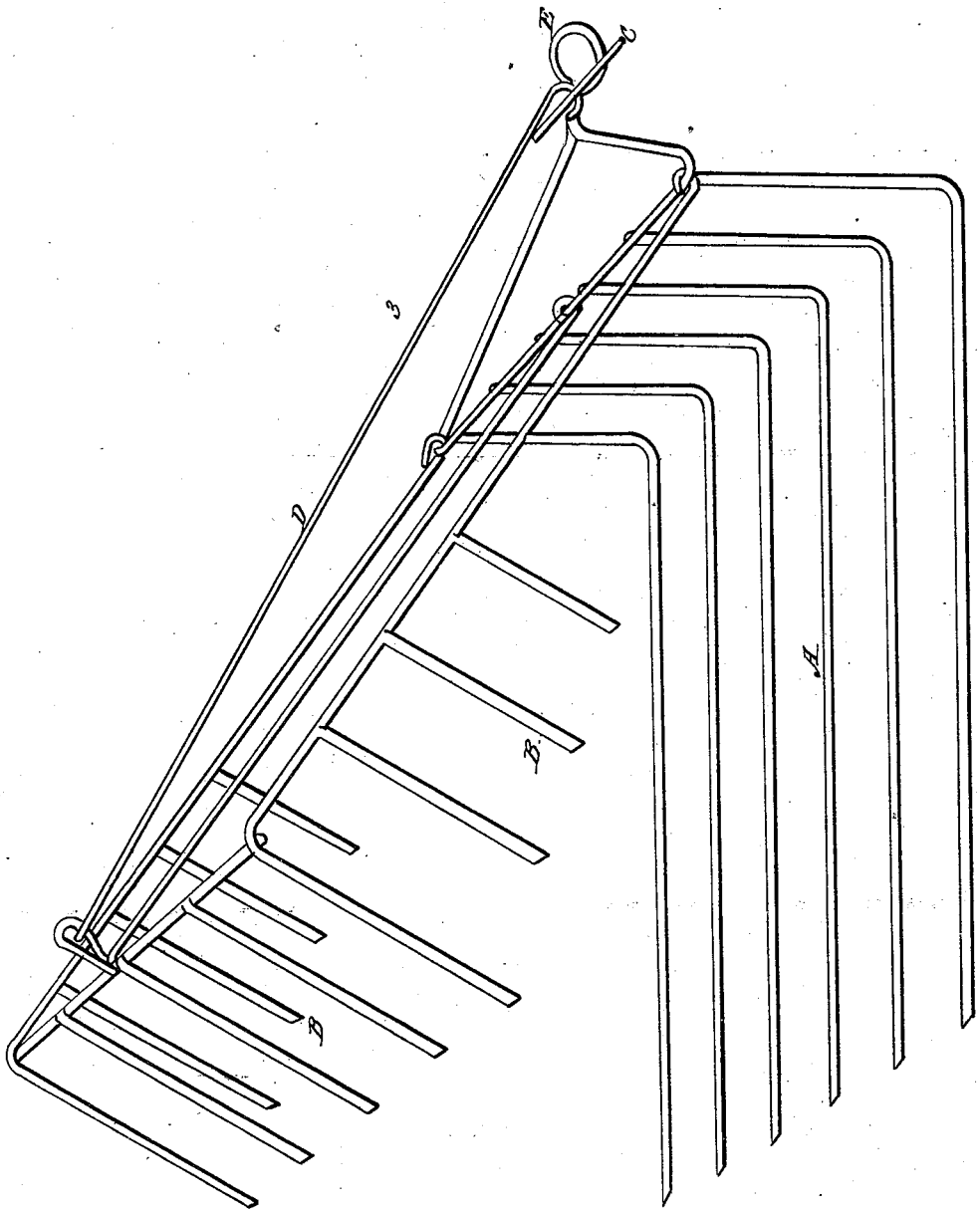
WITNESSES:
Annie E. Heim
A Evans
INVENTOR:
Solomon Kepner

United States Patent Office.

SOLOMON KEPNER, OF POTTSTOWN, PENNSYLVANIA.

Letters Patent No. 64,772, dated May 14, 1867.

DEVICE FOR CLEANING STABLES.

The Schedule referred to in these Letters Patent and making part of the same.

Be it known that I, SOLOMON KEPNER, of Pottstown, State of Pennsylvania, have invented a new and useful implement for cleaning stables, which I call a Stable-Cleaner; and I do hereby declare that the following is a full, clear, and exact description of the construction and operation of the same, reference being had to the annexed drawings, making a part of this specification, in which—

Figure 3 is a perspective view of said stable-cleaner.

A is a fork; B B are hooks; D is a rod; C is a handle; E is a ring.

The operation is as follows: When the cleaner is in a closed position the hooks B B are raised by the rod D. The ring on the end of said rod is passed over one end of the handle C, which holds the hooks in an elevated position. By means of the handle C the fork A is forced along on the floor or bottom under the manure; the rod D is then detached from handle C; the hooks will fall on the manure near the end of the fork A, and will be pressed down with the foot. The horse is attached to ring E; the draught will raise the front end of the fork, on which the load will slide, the hooks securely holding the manure within its limits.

What I claim as my invention, and desire to secure by Letters Patent, is—

The fork A and hooks B B, and combination of fork and hooks, for the purpose herein set forth.

SOLOMON KEPNER.

Witnesses:
A. E. KEIM,
A. EVANS.